(12) United States Patent
Cho et al.

(10) Patent No.: US 11,948,372 B2
(45) Date of Patent: Apr. 2, 2024

(54) VEHICLE ASSIST METHOD AND VEHICLE ASSIST DEVICE

(71) Applicants: Nissan Motor Co., Ltd., Yokohama (JP); RENAULT S.A.S., Boulogne-Billancourt (FR)

(72) Inventors: Hyeongsung Cho, Kanagawa (JP); Hiroshi Satoh, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/038,839

(22) PCT Filed: Nov. 27, 2020

(86) PCT No.: PCT/IB2020/000978
§ 371 (c)(1),
(2) Date: May 25, 2023

(87) PCT Pub. No.: WO2022/112810
PCT Pub. Date: Jun. 2, 2022

(65) Prior Publication Data
US 2024/0020989 A1 Jan. 18, 2024

(51) Int. Cl.
*G06V 20/56* (2022.01)
*G06T 3/40* (2006.01)
(Continued)

(52) U.S. Cl.
CPC .......... *G06V 20/588* (2022.01); *G06T 3/4053* (2013.01); *G06T 7/215* (2017.01);
(Continued)

(58) Field of Classification Search
CPC .. G06V 20/588; G06V 20/582; G06V 20/584; G06V 10/24; G06V 10/25; G06T 3/4053; G06T 7/215; G06T 7/38
See application file for complete search history.

(56) References Cited

U.S. PATENT DOCUMENTS 10,521,885 B2  12/2019  Takahashi et al.
2019/0042860 A1*  2/2019  Lee ..................... G06V 20/588

FOREIGN PATENT DOCUMENTS

CN  110033475 A  7/2019
JP  2006-318272 A  11/2006
(Continued)

OTHER PUBLICATIONS

Cho et al., "Improved lane detection system using Hough transform with Super-Resolution Reconstruction Algorithm and multi-ROI," 2014 International Conference on Electronics, Information and Communication (ICEIC), Jan. 15, 2014, pp. 1-4, IEEE, USA.
(Continued)

*Primary Examiner* — Casey L Kretzer
(74) *Attorney, Agent, or Firm* — Global IP Counselors, LLP

(57) ABSTRACT

A vehicle assist device includes a camera that captures the surroundings of a host vehicle at different times, and a controller that processes the plurality of images captured at different times by the camera. The controller extracts a stationary object region, which is a region corresponding to a stationary object, from each of a plurality of images captured at different times, aligns the plurality of images based on the movement amount of the stationary object in the image in the stationary object region, performs super-resolution processing using the plurality of aligned images to generate a super-resolution image that exceeds the reso-
(Continued)

lution of the image captured by the camera, and recognizes a road structure based on the super-resolution image.

14 Claims, 12 Drawing Sheets

(51) Int. Cl.
*G06T 3/4053* (2024.01)
*G06T 7/215* (2017.01)
*G06T 7/38* (2017.01)
*G06V 10/24* (2022.01)
*G06V 10/25* (2022.01)
*G06V 20/58* (2022.01)

(52) U.S. Cl.
CPC ................ *G06T 7/38* (2017.01); *G06V 10/24* (2022.01); *G06V 10/25* (2022.01); *G06V 20/582* (2022.01); *G06V 20/584* (2022.01)

(56) References Cited

FOREIGN PATENT DOCUMENTS

| | | |
|---|---|---|
| JP | 2009-59132 A | 3/2009 |
| JP | 2011-191905 A | 9/2011 |
| JP | 2015-191281 A | 11/2015 |

OTHER PUBLICATIONS

Katsaggelos et al., "Super Resolution of Images and Video," Synthesis Lectures on Image, Video, and Multimedia Processing #7, 2007, pp. 1-134, Morgan & Claypool, USA.

Yang et al.,. "Long-Distance Object Recognition with Image Super Resolution: A Comparative Study," Jan. 30, 2018, pp. 13429-13438, vol. 6, IEEE Access, USA.

* cited by examiner

VEHICLE ASSIST METHOD AND VEHICLE ASSIST DEVICE

CROSS-REFERENCE TO RELATED APPLICATIONS

This application is a U.S. national stage application of International Application No. PCT/IB2020/000978, filed on Nov. 27, 2020.

BACKGROUND

Technical Field

The present disclosure relates to a vehicle assist method and a vehicle assist device.

Background Information

Road sign recognition technology that uses camera images is known from the Japanese Laid Open Patent Application No. 2015-191281 (Patent Document 1). The road sign recognition technology disclosed in Patent Document 1 performs template matching of camera images to recognize road sign, which is a road structure.

SUMMARY

However, in regions in which the image resolution is low, such as regions distant from the host vehicle, template matching does not produce the desired results.

In view of the problem described above, an object of the present invention is to provide a vehicle assist method and a vehicle assist device that are capable of improving the recognition accuracy of road structures in regions where the image resolution is low.

A vehicle assist method according to one aspect of the present invention extracts a stationary object region, which is a region corresponding to a stationary object, from each of a plurality of images captured at different times, aligns the plurality of images based on the movement amount of the stationary object in the images in the stationary object regions, performs super-resolution processing using the plurality of aligned images to generate a super-resolution image that exceeds the resolution of the image captured by the camera, and recognizes a road structure based on the super-resolution image.

With the present invention, it becomes possible to improve the recognition accuracy of road structures in regions in which the image resolution is low.

BRIEF DESCRIPTION OF THE DRAWINGS

Referring now to the attached drawings which form a part of this original disclosure.

DETAILED DESCRIPTION

Figure 1:
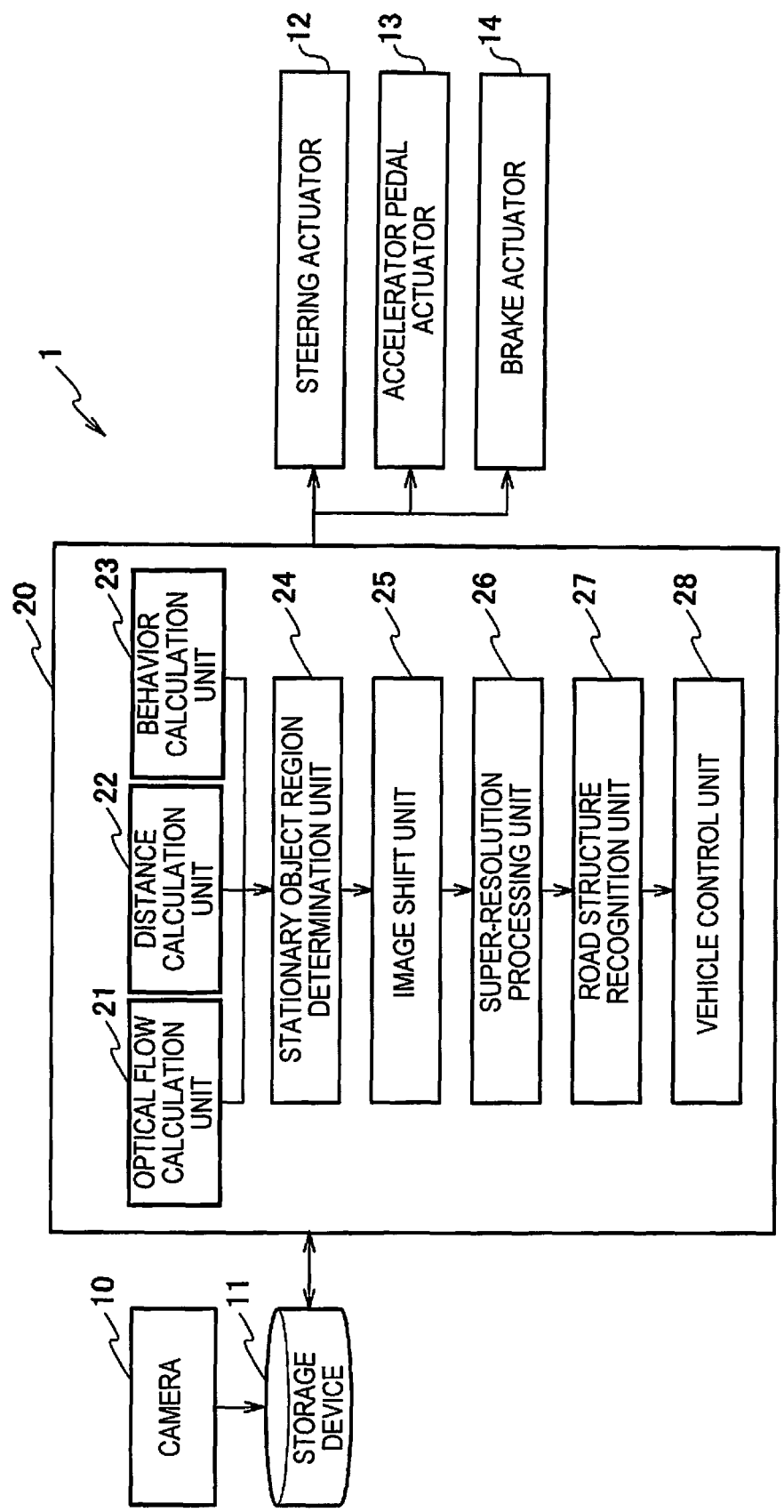
FIG. 1 is a block diagram of a vehicle assist device 1 according to a first embodiment.

An embodiment of the present invention is described below with reference to the figures. In the descriptions of the figures, identical parts have been assigned the same reference numerals, and their descriptions have been omitted.

A configuration example of a vehicle assist device 1 will be described with reference to FIG. 1. As shown in FIG. 1, the vehicle assist device 1 comprises a camera 10, a storage device 11, a controller 20, a steering actuator 12, a accelerator pedal actuator 13, and a brake actuator 14.

The vehicle assist device 1 may be installed in a vehicle that has an autonomous driving function or a vehicle that does not have an autonomous driving function. The vehicle assist device 1 may also be mounted in a vehicle that can switch between autonomous driving and manual driving. Further, the autonomous driving function may be a driving assistance function that automatically controls only some of the vehicle control functions, such as the steering control, braking force control, driving force control, and the like, thus assisting the driver's driving. In this embodiment, the vehicle assist device 1 is described as being installed in a vehicle that has an autonomous driving function.

The camera 10 comprises an imaging element, such as a CCD (charge-coupled device), CMOS (complementary metal oxide semiconductor), and the like. Although the installation location of the camera 10 is not particularly limited, the camera 10 is installed, for example, in the front of, on the side of, or in the rear of a host vehicle. The camera 10 continuously captures the surroundings of the host vehicle at a prescribed cycle. That is, the camera 10 acquires a plurality of images captured at different times. The camera 10 detects objects in the host vehicle surroundings (pedestrians, bicycles, motorcycles, other vehicles, and the like) as well as information pertaining to what is ahead of the host vehicle (road boundary lines, traffic lights, signs, pedestrian crossings, intersections, and the like). Images captured by the camera 10 are stored in the storage device 11.

The storage device 11 primarily stores images captured by the camera 10. The storage device 11 is, for example, composed of an HDD (Hard Disk Drive) or SSD (Solid State Drive).

The controller 20 is a general-purpose microcomputer comprising a CPU (central processing device), memory, and an input/output unit. A computer program is installed in the microcomputer to make it function as the vehicle assist device 1. By executing the computer program, the microcomputer functions as a plurality of information processing circuits included in the vehicle assist device 1. Here, an example is shown in which the plurality of information processing circuits included in the vehicle assist device 1 is realized in software, but the information processing circuits can of course comprise dedicated hardware for executing each of the information processes shown below. Further, the plurality of information processing circuits may be realized in discrete hardware. The controller 20 comprises an optical flow calculation unit 21, a distance calculation unit 22, a behavior calculation unit 23, a stationary object region determination unit 24, an image shift unit 25, a super-resolution processing unit 26, a road structure recognition unit 27, and a vehicle control unit 28, as examples of the plurality of information processing circuits.

The optical flow calculation unit 21 uses past and current images to calculate how much an object in the image has moved. An optical flow represents the motion of an object in an image as a vector. One example of the calculation method will be described. An image captured at time T1 is defined as image I1, and an image captured at time T2 is defined as image I2. Assume time T1<time T2. The optical flow calculation unit 21 segments image I1 into arbitrary sizes. The arbitrary size is not particularly limited; here, it is assumed that the size of the image in the horizontal direction is N pixels and the size of the image in the vertical direction is M pixels. The arbitrary size is thus N×M. The optical flow calculation unit 21 compares the region of image I1 (N×M) and the region of image I2 (N×M). Known comparison methods include SSD (Sum of Squared Difference), SAD (Sum of Absolute Difference), ZNCC (Zero-mean Normalized Cross-Correlation), and the like. These methods are well-known and thus their descriptions have been omitted. The optical flow calculation unit 21 detects, as a related feature point, a feature point on a current image corresponding to the same target as a target in real space corresponding to a feature point on a past image. The optical flow calculation unit 21 calculates a combination of a feature point on a past image and a feature point on a current image that are related to each other as the optical flow.

The distance calculation unit 22 calculates the distance from the camera 10 to an object corresponding to the feature point from the parallax (amount of shift) between the feature point on a past image and the feature point on a current image that are related to each other. In other words, the distance calculation unit 22 calculates the distance from the host vehicle to the object corresponding to the feature point. The distance calculation unit 22 calculates three-dimensional coordinates in real space corresponding to these feature points from the parallax between the feature point on the past image and the feature point on the current image that are related to each other. The distance calculation unit 22 may calculate the distance to the object by combining a radar or LiDAR with the camera 10.

The behavior calculation unit 23 calculates the three-axis translational motion and the three-axis rotational motion of the host vehicle. The three-axis translational motion is the motion of the host vehicle in the front-rear direction, vehicle width direction, and vertical direction. The three-axis rotational motion is the rotational motion around three axes, which include the roll axis, pitch axis, and yaw axis. These motions are calculated using wheel speed sensor, acceleration sensor, rotation sensor, and the like. Alternatively, these motions are calculated using images. A known example of a calculation method using images is non-patent document 1 "KITT, Bernd; GEIGER, Andreas; LATEGAHN, Henning, Visual odometry based on stereo image sequences with ransac-based outlier rejection scheme in: 2010 IEEE Intelligent Vehicles Symposium. IEEE, 2010. p. 486-492."

The stationary object region determination unit 24 combines the optical flow calculated by the optical flow calculation unit 21, the calculation result of the distance calculation unit 22, and the calculation result of the behavior calculation unit 23 to calculate a three-dimensional movement amount (three-dimensional motion vector) that excludes the behavior of the host vehicle. The stationary object region determination unit 24 compares the calculated absolute movement amount with a threshold value. If the movement amount is less than or equal to the threshold value, it is determined that a moving object such as another vehicle is not present in that region. That is, if the movement amount is less than or equal to the threshold value, the region is determined to be a stationary object region.

The image shift unit 25 calculates the movement amount between images and shifts the images by the calculated movement amount in order to align the images. The movement amount of the images is the movement amount between two images. SSD, SAD, ZNCC, etc., as well as optical flow, are used to calculate the movement amount. Specifically, the image shift unit 25 shifts the image one pixel at a time in the vertical and horizontal directions within a search range to calculate a degree of similarity, and calculates, as the movement amount, the movement amount required to move to the location with the highest degree of similarity. In order to compare two images, a reference image is required. Thus, the image I1 captured at time T1 is used as the reference image. The image I1 is referred to as the reference image R1 below. The reference image R1 has A pixels in the horizontal direction and B pixels in the vertical direction. Assume that the coordinates of the center are (X1, Y1) as representative coordinates of the reference image R1.

Next, in image I2 captured at time T2, which is a different time than the time T1, a prescribed search range is set referenced to coordinates (X1, Y1). For example, if S pixels are set in the vertical and horizontal directions, the search range is from (X1−S, Y1−S) to (X1+S, Y1+S). Assume that the coordinates of the center of the image I2 are (a, b). The reference image R1 and image I2 are compared, and the center coordinates (aM, bM) with the highest degree of similarity of the pixels become the destination of movement of (X1, Y1). The destination of (X1, Y1) is referred to as (X2, Y2).

Similarly, in an image I3 captured at time T3, which is a different time than the times T1 and T2, a search range is set referenced to (X2, Y2). The reference image R1 and the image I3 are compared, and (X3, Y3) is set, which is the destination of movement of (X2, Y2). At this time, the image shift unit 25 may use a prescribed number of frames to update the image at that time as the reference image R1. In the calculation of degree of similarity, A×B pixels, which are all the pixels of the reference image R1, are used, and the luminance values of the same coordinates of the reference image R1 and comparative images are compared. The comparative images refer to images I2 and I3.

In the case of SAD, the sum of the absolute values of the luminance differences is calculated, and in the case of SSD, the sum of the squares of the luminance differences is calculated. In addition, if the degree of similarity is below the threshold value at any center pixel in the search range, the movement amount calculation is stopped. In this embodiment, in order to calculate the movement amount of a road structure, which is a stationary object, regions in which moving objects are present are excluded in order to calculate the degree of similarity. That is, the degree of similarity is calculated only in stationary object regions. Here, a stationary object region determined by the stationary object region determination unit 24 in the reference image R1 is defined as a reference region. In addition, in each comparative image, a stationary object region determined by the stationary object region determination unit 24 is defined as a comparative region. Pixels where the reference region and the comparative region overlap are used for the calculation of the degree of similarity. As a result, the obtained movement amount is expressed in units of pixels. In order to calculate the movement amount of pixels after the decimal point, an approximation calculation using the result of the calculation of the degree of similarity is carried out. For example, the method of non-patent document 2 is used for such approximation calculation. See non-patent Document 2, "Arai, Motoki, Kazuhiko Sumi, and Takashi Matsuyama, Optimization of Correlation Function and Subpixel Estimation Method in Image Block Matching, Information Processing Society of Japan Research Report: Computer Vision and Image Media (CVIM), 2004. 40 (2004-CVIM-144) (2004): 33-40."

Let N be the desired magnification. In this case, the image shift unit 25 rounds the movement amount to 1/N pixels. The image shift unit 25 sets the movement amounts (MX2, MY2) . . . (MXn, MYn) from the center coordinates (X1, Y1) at time T1, for each time T2 . . . Tn. The image shift unit 25 then scales images J1, J2 . . . Jn, whose sizes are A pixels in the horizontal direction and B pixels in the vertical direction, centered at center coordinates (X1, Y1), (X2, Y2) . . . (Xn, Yn) at each time, by a factor of N. As a result, images K1, K2 . . . Kn are generated. Methods of scaling include nearest neighbor interpolation, bilinear interpolation, and bicubic interpolation. The scaled images are returned by multiplying the movement amount by a factor of N, and are expressed in units of 1/N pixels. The image shift unit 25 moves and aligns the comparative image with respect to the reference image so that the center coordinates match.

The super-resolution processing unit 26 uses images that were aligned by the image shift unit 25 to perform super-resolution processing and generates a high resolution image. Let Z be the number of images required for the execution of super-resolution processing. The super-resolution processing unit 26 calculates, by taking the arithmetic mean, the luminance value of each pixel with respect to images K1, K2 . . . Kz, which have been enlarged by a factor of N by the image shift unit 25 and whose center coordinates match. However, if tracking cannot be carried out from the reference image R1 in a state in which Z images have not been collected, or if the entire region for carrying out super-resolution processing is filled with moving objects, the super-resolution processing unit 26 stops the super-resolution processing. Super-resolution processing is a technique in which a plurality of images are referenced to generate a high-resolution image. In this embodiment, alignment is carried out such that the comparative images overlap the reference image R1, thereby increasing the resolution of the reference image R1. In other words, an image having a resolution that is greater than that of the image captured by the camera 10 is generated. The image generated by the super-resolution processing unit 26 is output to the road structure recognition unit 27.

The road structure recognition unit 27 uses the image input from the super-resolution processing unit 26 to recognize road structures. In this embodiment, a road structure is defined as a stationary object. Specifically, road structures include lanes, stop lines, pedestrian crossings, arrows, and other road surface markings, structures such as road shoulders, curbs, signs, and traffic signals. An example of a method for recognizing road structures that can be used is a semantic segmentation, which recognizes what type of object each pixel is. The road structure recognition unit 27 outputs the recognition results to the vehicle control unit 28.

The vehicle control unit 28 controls the steering actuator 12, the accelerator pedal actuator 13, and the brake actuator 14 using the road structures recognized by the road structure recognition unit 27. The stationary object region becomes clear as a result of the super-resolution processing. The recognition accuracy of road structures is thereby improved.

Next, an example of a stationary object region will be described with reference to FIG. 2.

Figure 2:
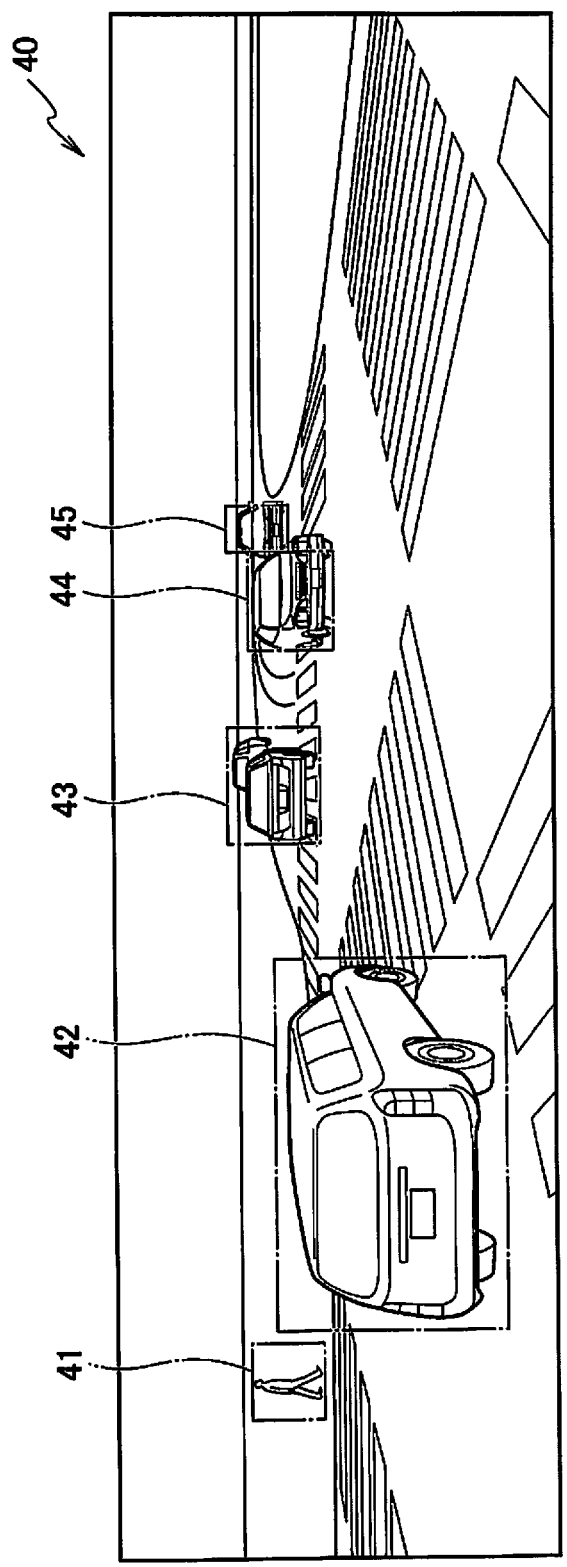
FIG. 2 is a diagram explaining an example of a stationary object region.

An image 40 shown in FIG. 2 is an image captured by the camera 10 while the host vehicle is traveling. In the scenario shown in FIG. 2, the host vehicle is passing through an intersection. Another vehicle 42 is in the front of the host vehicle on the left side. Another vehicle 43 is in front of the other vehicle 42. Other vehicles 44, 45 are in the oncoming lane. A pedestrian 41 is present to the left and behind the host vehicle.

The stationary object region determination unit 24 determines stationary object regions by using the method described above. In the example shown in FIG. 2 the stationary object region is the area excluding the other vehicles 42-45 and the pedestrian 41. If it is determined that a stationary object region exists, the image is treated as the reference image R1. That is, the image 40 shown in FIG. 2 is set as the reference image R1. Assuming that image 40 was captured at time T1, images captured after time T1, that is, at times T2 . . . Tn, are set as the comparative images.

Figure 3:
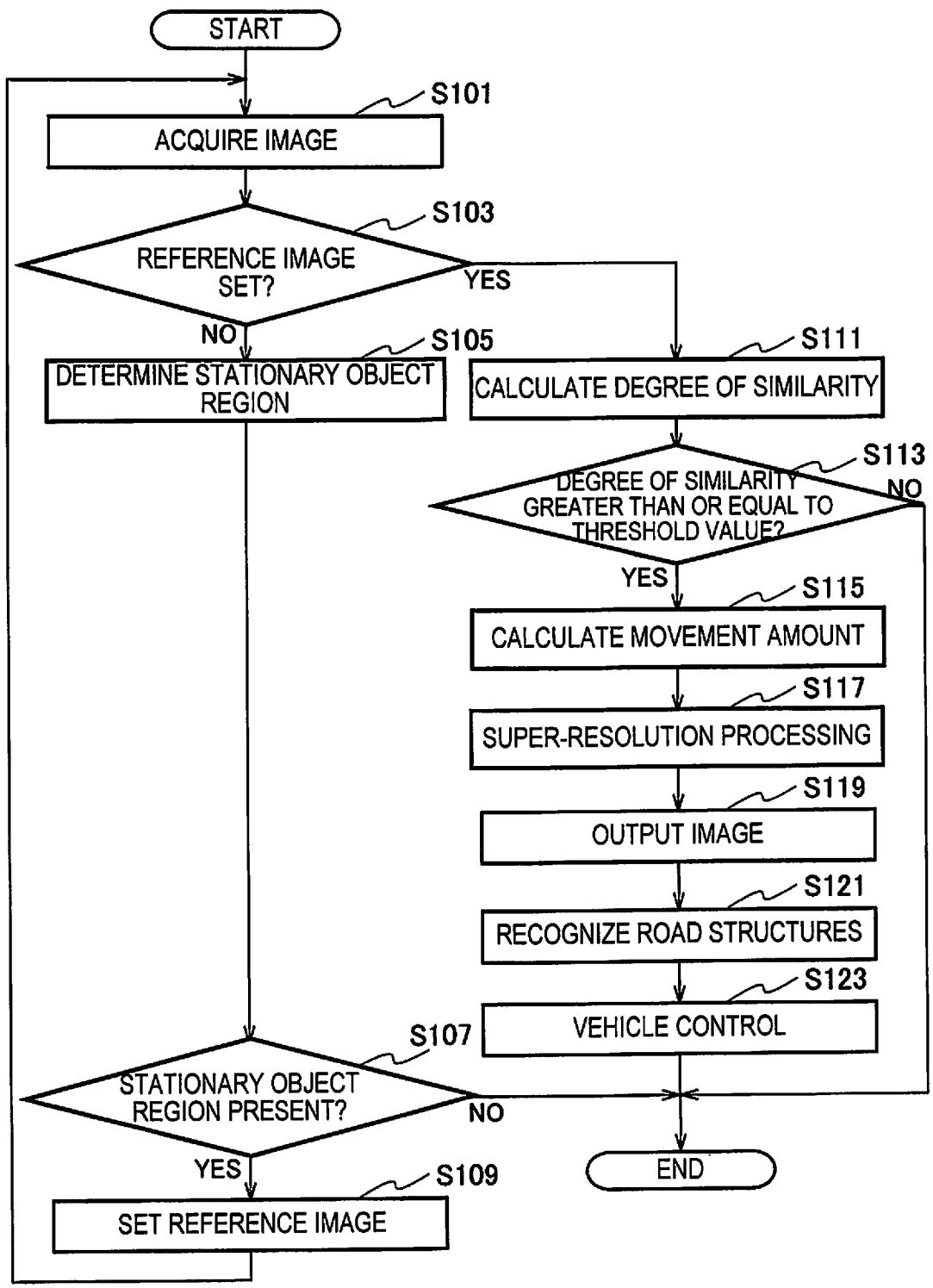
FIG. 3 is a flowchart explaining an operation example of the vehicle assist device 1.

An operation example of the vehicle assist device 1 will now be described with reference to the flowchart shown in FIG. 3.

In Step S101, the surroundings of the host vehicle are captured by the camera 10 mounted on the host vehicle. The process proceeds to Step S103; if the reference image R1 is set (YES in Step S103), the process proceeds to Step S111. On the other hand, if the reference image R1 is not set (NO in Step S103), the process proceeds to Step S105.

In Step S105, the stationary object region determination unit 24 determines whether the image includes a region in which moving objects are not present. Optical flow or other methods are used for this determination. Examples of moving objects are the other vehicles 42-45 and the pedestrian 41 shown in FIG. 2. If the image includes a region in which moving objects are not present (YES in Step S107), the image is set as the reference image R1 (Step S109). On the other hand, if the image does not include a region in which moving objects are not present (NO in Step S107), the process ends. In Step S109, the stationary object region is set as the reference region.

In Step S111, the image shift unit 25 calculates the degree of similarity between the reference image R1 and a reference image captured at a different time than the reference image R1. As described above, the image shift unit 25 calculates the degree of similarity for the region in which the reference region and the comparative region overlap, within the prescribed range. A comparative region is the stationary object region in each comparative image. The luminance values at the same coordinates of the reference region and the comparative region are compared in terms of degree of similarity. If the degree of similarity is greater than or equal to a threshold value (YES in Step S113), the process proceeds to Step S115. On the other hand, if the degree of similarity is less than the threshold value (NO in Step S113), the process ends.

In Step S115, the image shift unit 25 calculates the movement amount between images, as described above, and moves the images by the calculated movement amount in order to align the images. In Step S117, the super-resolution processing unit 26 uses the images aligned by the image shift unit 25 to generate a high-resolution image. In Step S119, the image generated by the super-resolution processing unit 26 is output to the road structure recognition unit 27. In Step S121, the road structure recognition unit 27 uses the image input from the super-resolution processing unit 26 to recognize road structures. In Step S123, the vehicle control unit 28 uses the road structures recognized by the road structure recognition unit 27 to control the steering actuator 12, the accelerator pedal actuator 13, and the brake actuator 14. Super-resolution processing makes the stationary object regions clearer. The recognition accuracy of road structures is thereby improved.

As described above, the following actions and effects can be achieved by using the vehicle assist device 1 according to the first embodiment.

The vehicle assist device 1 is equipped with the camera 10 that takes a plurality of images of the surroundings of a host vehicle at different times, and the controller 20 that processes the plurality of images taken at different times by the camera 10. The controller 20 extracts a stationary object region, which is a region corresponding to a stationary object from each of the plurality of images. The controller 20 aligns the plurality of images based on the movement amount of the stationary object in the image in the stationary object region. The controller 20 carries out super-resolution processing using the plurality of aligned images to generate a super-resolution image that exceeds the resolution of the image captured by the camera 10. The controller 20 recognizes road structures based on the super-resolution image. As a result, the movement amount between images is calculated in a state in which the moving objects in the images are excluded. A super-resolution image that exceeds the resolution of the image captured by the camera 10 is generated against a background in which road structures, which are stationary objects, are present. It thus becomes possible to improve the recognition accuracy of road structures in regions in which the image resolution is low.

In the conventional technology described above, consider performing super-resolution processing in an attempt to detect a distant road structure that is undetectable by using template matching. If there is a moving object in a region where super-resolution processing is to be performed, the moving object will be tracked. This prevents super-resolution processing of the road structure to be recognized from being performed, and the background may be blurred. In the first embodiment, since moving objects are removed, it becomes possible to carry out super-resolution processing of the road structures, and the background becomes clearer. The recognition accuracy of road structures is thus improved.

In addition, the controller 20 sets a reference image, which serves as a reference when carrying out super-resolution processing from among a plurality of images. The controller 20 calculates the degree of similarity of the region where the reference image and images other than the reference image overlap, and uses the movement amount based on the degree of similarity to carry out alignment. As a result, the degree of similarity is calculated using only stationary object regions in both the reference image and the image at each time. It thus becomes possible to calculate the degree of similarity even if a stationary object region that is hidden by a moving object changes with time.

The controller 20 also replaces the image with a super-resolution image for each segmented region in order to generate a single image. The controller 20 then recognizes road structures based on this generated image. Thus, even if a super-resolution image is generated for only one region, the recognition accuracy of road structures is improved in that region. The image to be replaced is not particularly limited, but may be, for example, a reference image.

The controller 20 also selects a region having a specific movement amount from among the plurality of segmented regions. The computational load required for the super-resolution processing is thereby reduced. A region having a specific movement amount is, for example, the right half region as seen from the host vehicle.

The controller 20 also extracts a stationary object region based on a three-dimensional motion vector of a feature point measured by at least one of the camera 10, LiDAR, and radar, and the motion sensor of the host vehicle. By subtracting the behavior of the host vehicle from the measured three-dimensional motion vector, regions with moving objects can be extracted. The stationary object regions are extracted by excluding the regions with moving objects. The motion sensor of the host vehicle is the host vehicle behavior that is detected by a wheel speed sensor, an acceleration sensor, a rotation sensor, etc.

The controller 20 also sets the number Z of images used for the super-resolution processing. As a result, the required number of images for the desired magnification is secured. The controller 20 carries out super-resolution processing if the number of images captured by the camera 10 is greater than or equal to the set number Z of images.

The controller 20 also controls the host vehicle travel based on the recognized road structures. Since the travel is controlled based on signs, traffic lights, and road marking distant from the host vehicle, highly accurate autonomous driving can be realized.

Second Embodiment

Figure 4:
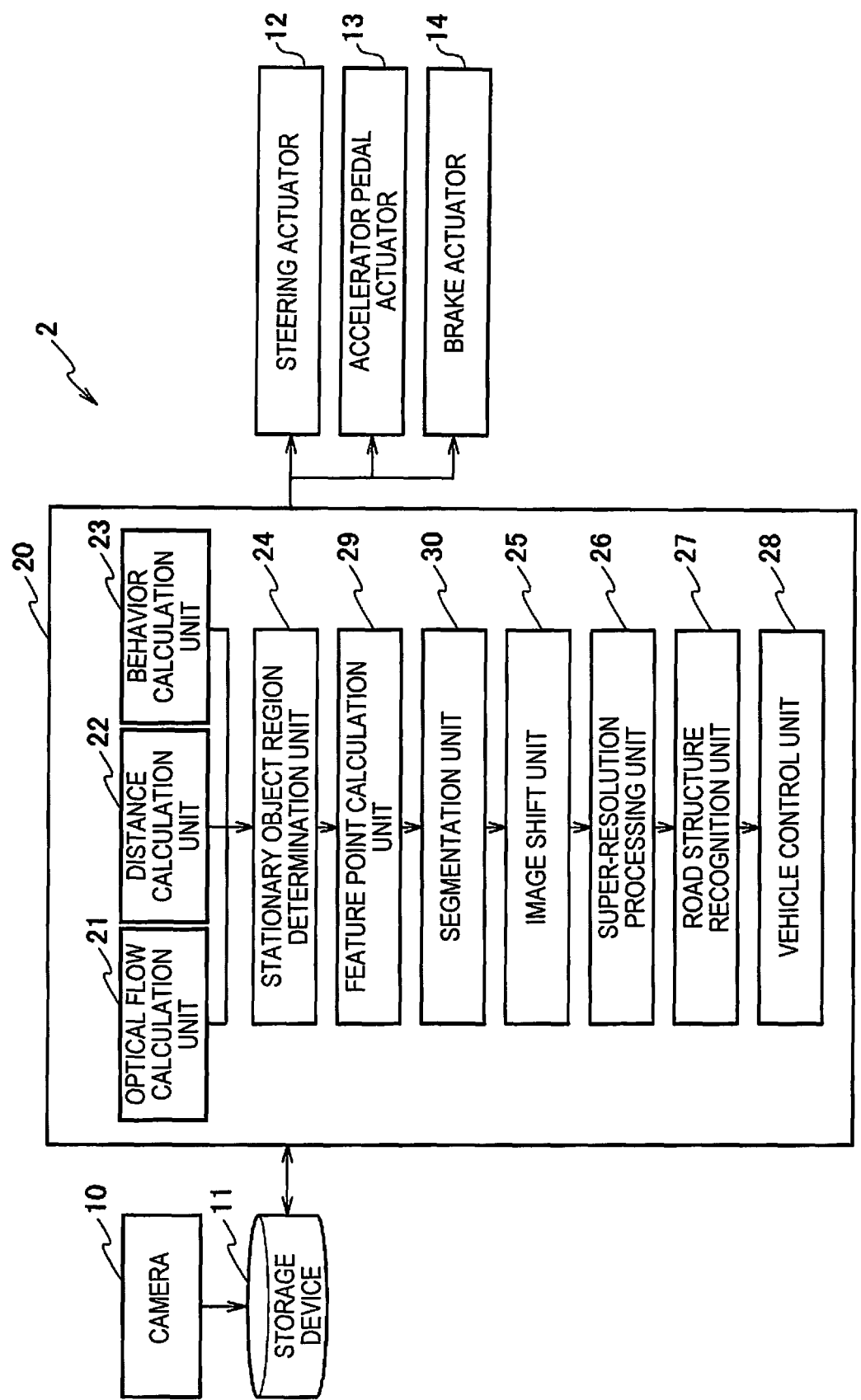
FIG. 4 is a block diagram of a vehicle assist device 2 according to a second embodiment.

A vehicle assist device 2 according to a second embodiment of the present invention will now be described with reference to FIG. 4. The second embodiment differs from the first embodiment in that the controller 20 further comprises a feature point calculation unit 29 and a segmentation unit 30. The same reference numerals have been used for configurations that overlap those of the first embodiment, and their descriptions have been omitted. The following description will primarily focus on the differences.

The feature point calculation unit 29 calculates the movement amount of a feature point in the stationary object region. A feature point refers to a pixel in an arbitrary image that has a feature distinguishable from surrounding pixels.

The segmentation unit 30 segments the stationary object region based on the movement amount calculated by the feature point calculation unit 29. In all stationary object regions, there are cases in which the movement amount of a feature point may not be constant. Let N be the desired magnification. In the same manner as the first embodiment, the center coordinates are aligned after being moved by the movement amount in units of 1/N. The segmentation unit 30 segments a region in which the movement amount is 0 as region A0, a region in which the movement amount is 1/N as region A1, a region in which the movement amount is 2/N as region A2 . . . and a region with the maximum movement amount of M/N as region AM. The image shift unit 25 specifies one or a plurality of regions among the segmented regions A0, A1 . . . AM, and aligns the images so that the center coordinates match. The super-resolution processing unit 26 uses the images that have been aligned by the image shift unit 25 to generate a high-resolution image. In super-resolution processing, a super-resolution image is generated for each of the segmented regions, which are replaced by the generated super-resolution images, in order to generate single image.

Figure 5:
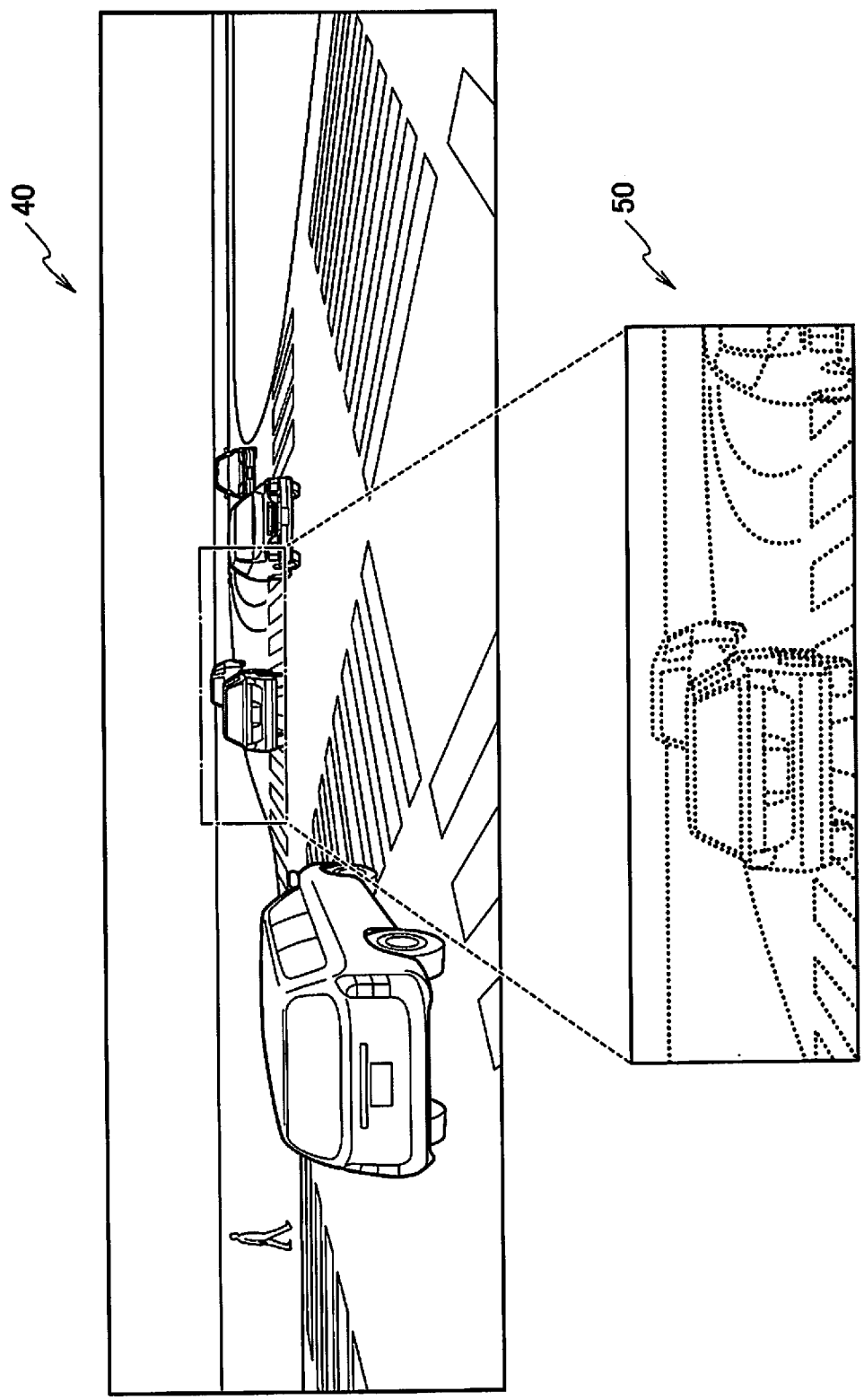
FIG. 5 is a diagram explaining a method of segmenting a stationary object region.

A method for segmenting a stationary object region will now be described with reference to FIGS. 5-6. For the sake of convenience of explanation, an image 50, which is a part of the image 40 shown in FIG. 5, will be used. Of course, the entire image 40 may be segmented by using the method described below. The image 40 shown in FIG. 5 is the same as the image 40 shown in FIG. 2.

Figure 6:
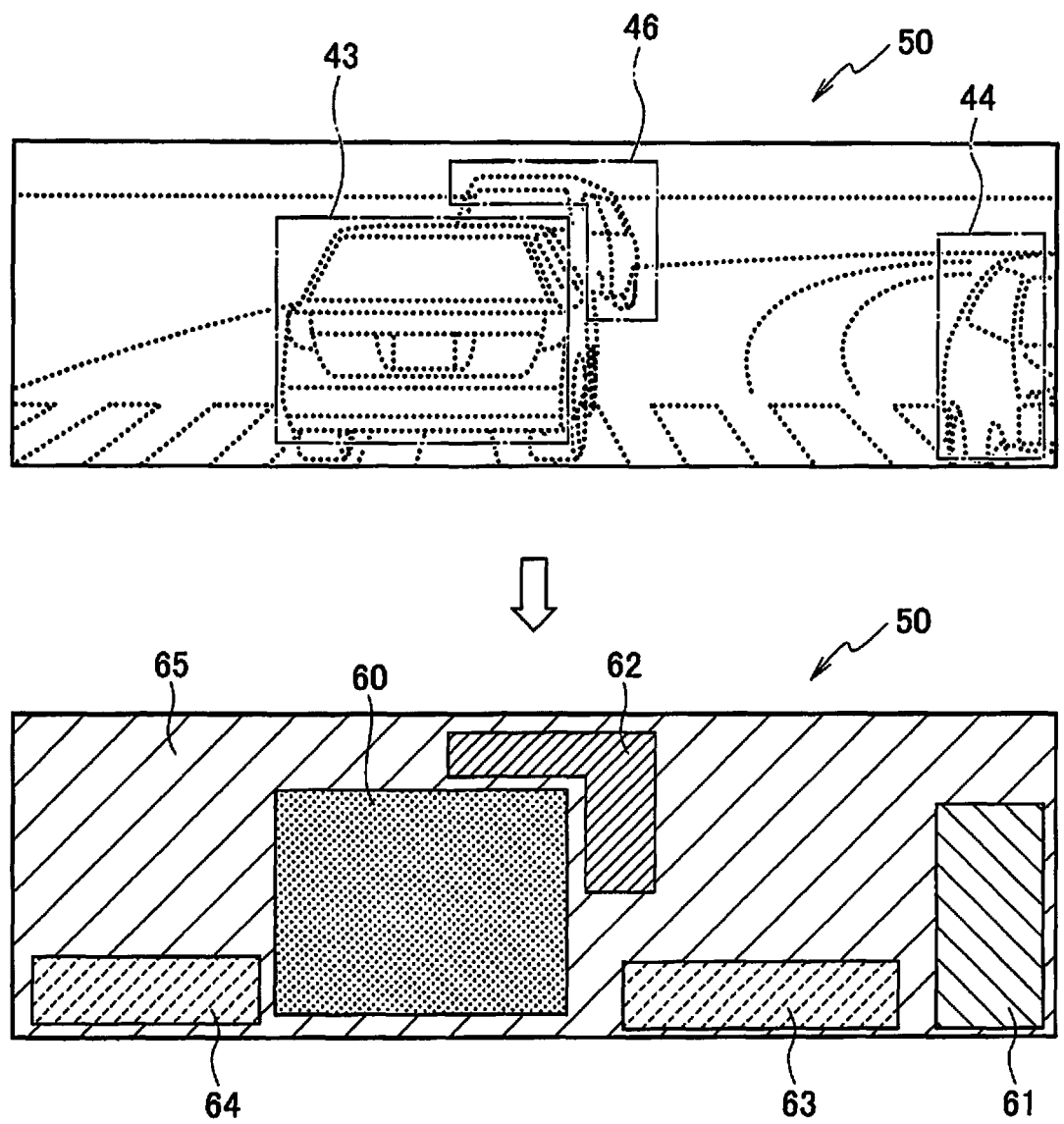
FIG. 6 is a diagram explaining a method of segmenting a stationary object region.

As shown in FIG. 6, a stationary object region is extracted from the image 50. The stationary object region is the region excluding the other vehicles 43, 44, 46. The method for extracting the stationary object region is the same as in the first embodiment. In the lower part of FIG. 6, reference numeral 60 indicates a set of feature points of the other vehicle 43. Reference numeral 61 indicates a set of feature points of the other vehicle 44. Reference numeral 62 indicates a set of feature points of the other vehicle 46. Reference numerals 63, 64 indicate sets of feature points of a pedestrian crossing. Reference numeral 65 indicates a set of feature points of the region excluding reference numerals 60-64. As described above, since reference numerals 60, 61, and 62 are excluded in the determination of the stationary object region, the feature points remaining in the image 50 are reference numerals 63, 64, and 65.

The amounts of movement of feature points of the same road structure are generally the same. The segmentation unit 30 uses feature points with the same movement amounts calculated by the feature point calculation unit 29 in order to segment the stationary object region. As a result, the stationary object region is segmented into the region indicated by reference numeral 63, the region indicated by reference numeral 64, and the region indicated by reference numeral 65. That is, in the image 50, the stationary object region is segmented into three regions. Alignment by the image shift unit 25 is carried out for each of the segmented regions. Subsequent processes are the same as those in the first embodiment.

Figure 7A:
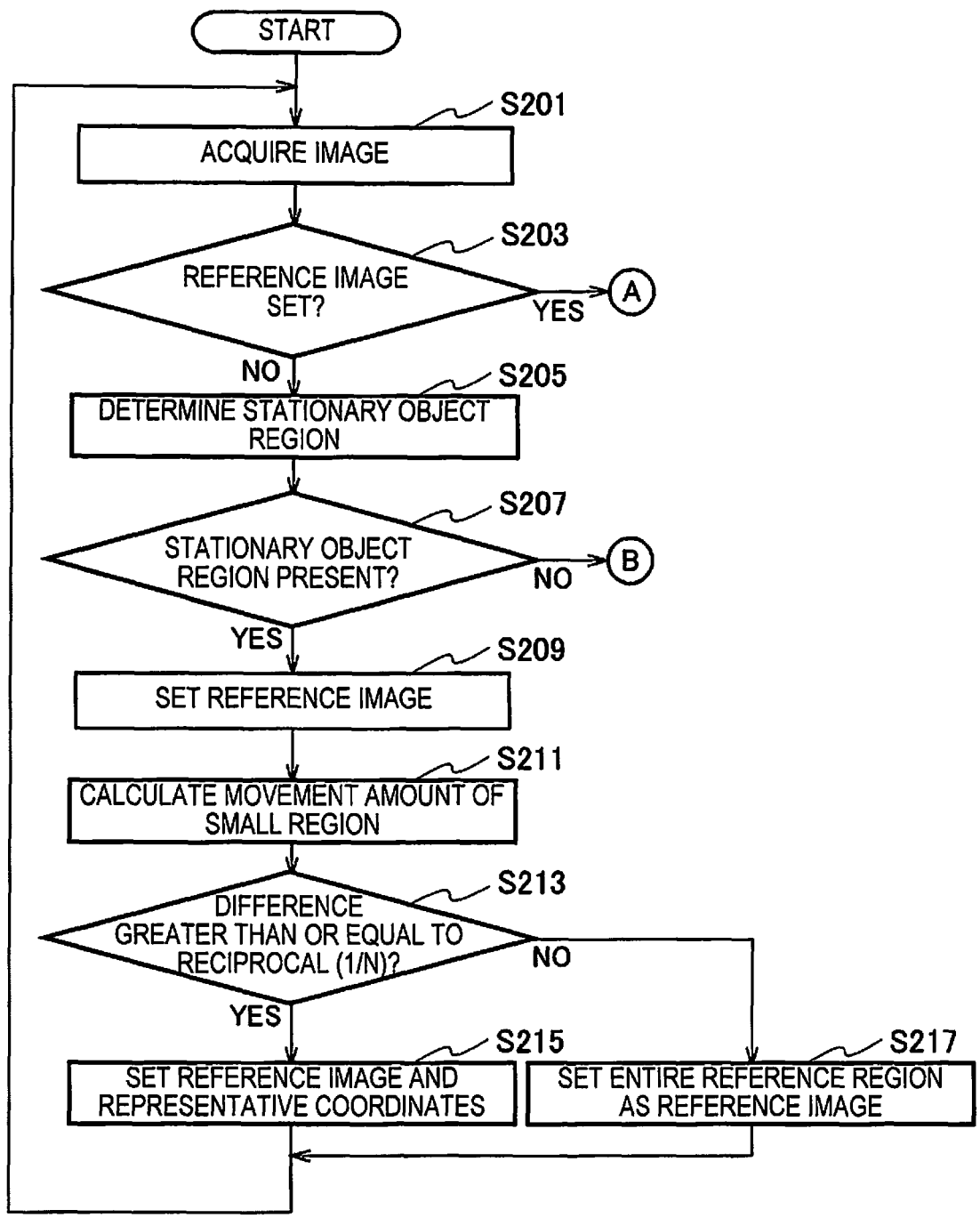
FIG. 7A is a flowchart explaining an operation example of the vehicle assist device 2.
Figure 7B:
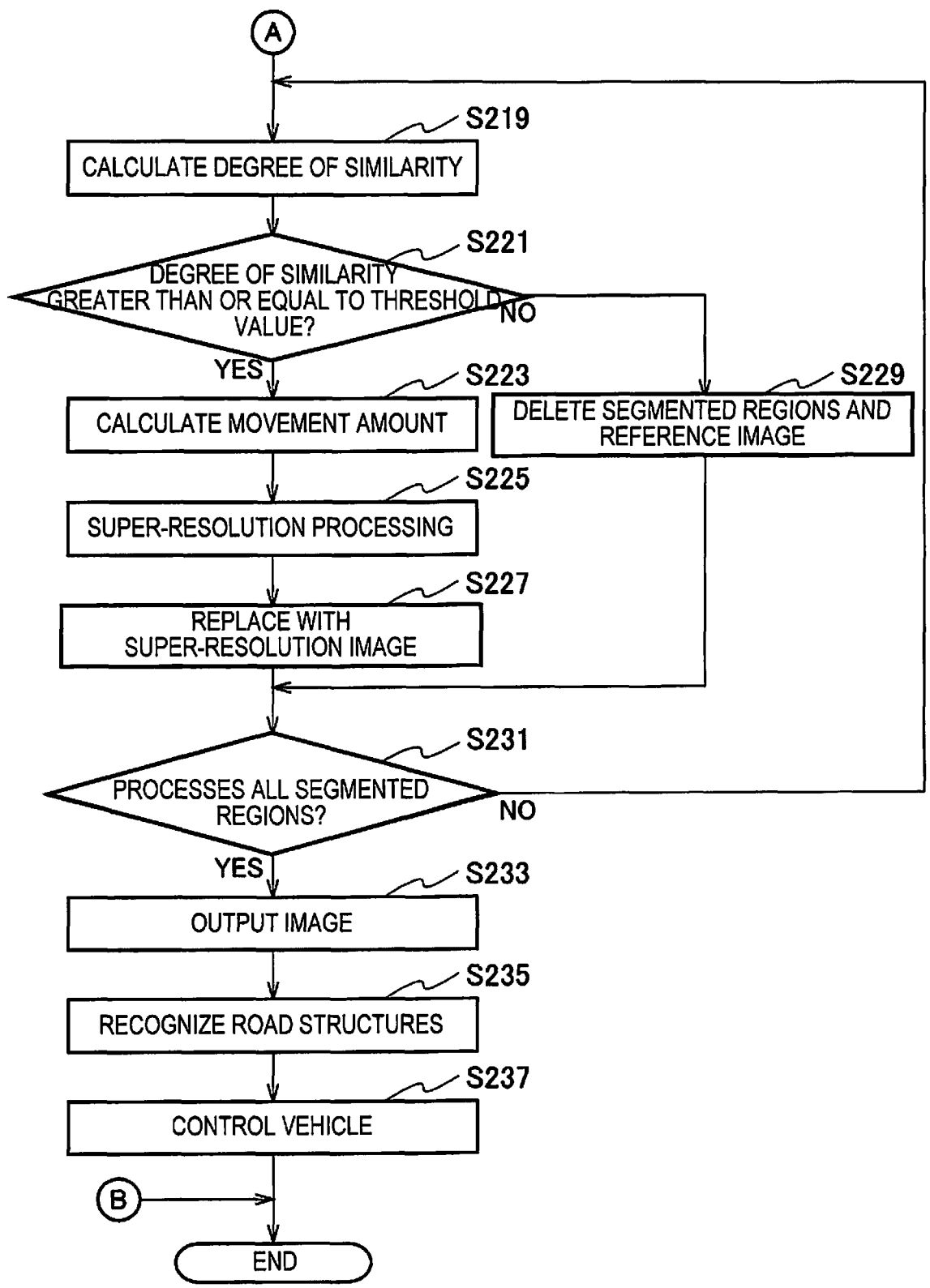
FIG. 7B is a flowchart explaining an operation example of the vehicle assist device 2.

An operation example of the vehicle assist device 2 will now be described with reference to the flowchart shown in FIGS. 7A-7B. However, the processes of Steps S201-S209, S219-225, and S233-S237 are the same as the processes of Steps S101-S123 shown in FIG. 3, so that their descriptions have been omitted.

In S211, the feature point calculation unit 29 calculates the movement amount of the feature points in a small region of the stationary object region. A small region is a region that includes few feature points, for example. Let N be the desired magnification. If the difference between the minimum value and the maximum value of the movement amount is greater than or equal to the reciprocal of the magnification (1/N) (YES in Step S213), the segmentation unit 30 segments the region by 1/N of the movement amount. Each segmented region is set as a reference image. Representative coordinates (center coordinates) of the set reference image are set (Step S215). In FIG. 6, the regions indicated by reference numerals 63, 64, and 65 correspond to the segmented regions. In FIG. 6, the regions indicated by reference numerals 63, 64, and 65 are set as reference images. On the other hand, if the result is NO in Step S213, all of the reference regions are set as reference images (Step S217).

If the result is NO in Step S221, the segmented regions and reference images are deleted. In Step S227, a super-resolution image is generated for each of the segmented regions, which are replaced by the generated super-resolution images, to thereby generate one image. If the result is YES in Step S231, the process proceeds to Step S233. If the result is NO in Step S231, the process returns to Step S219.

As described above, the following actions and effects can be achieved by using the vehicle assist device 2 according to the second embodiment.

The controller 20 calculates the movement amount of feature points on the image in each stationary object region of the plurality of images captured at different times and segments the image into regions having similar movement amounts of the feature points. The controller 20 then performs super-resolution processing for each segmented region. In the generation of the super-resolution image, a more accurate generation is achieved when the entire image has the same movement amount. However, in many cases, the motion is different from part to part. Therefore, the controller 20 segments the image for each portion with the same motion to perform super-resolution processing. As a result, an image with an overall high resolution is generated.

If the desired magnification is defined as N, the controller 20 sets 1/N pixels as the threshold value of the movement amount in the vertical and horizontal directions of the image, and divides the region if the movement amount is greater than or equal to the threshold value. As a result, since the region is segmented in units of resolution required for the desired magnification, a super-resolution image having the desired magnification is generated.

Third Embodiment

Figure 8:
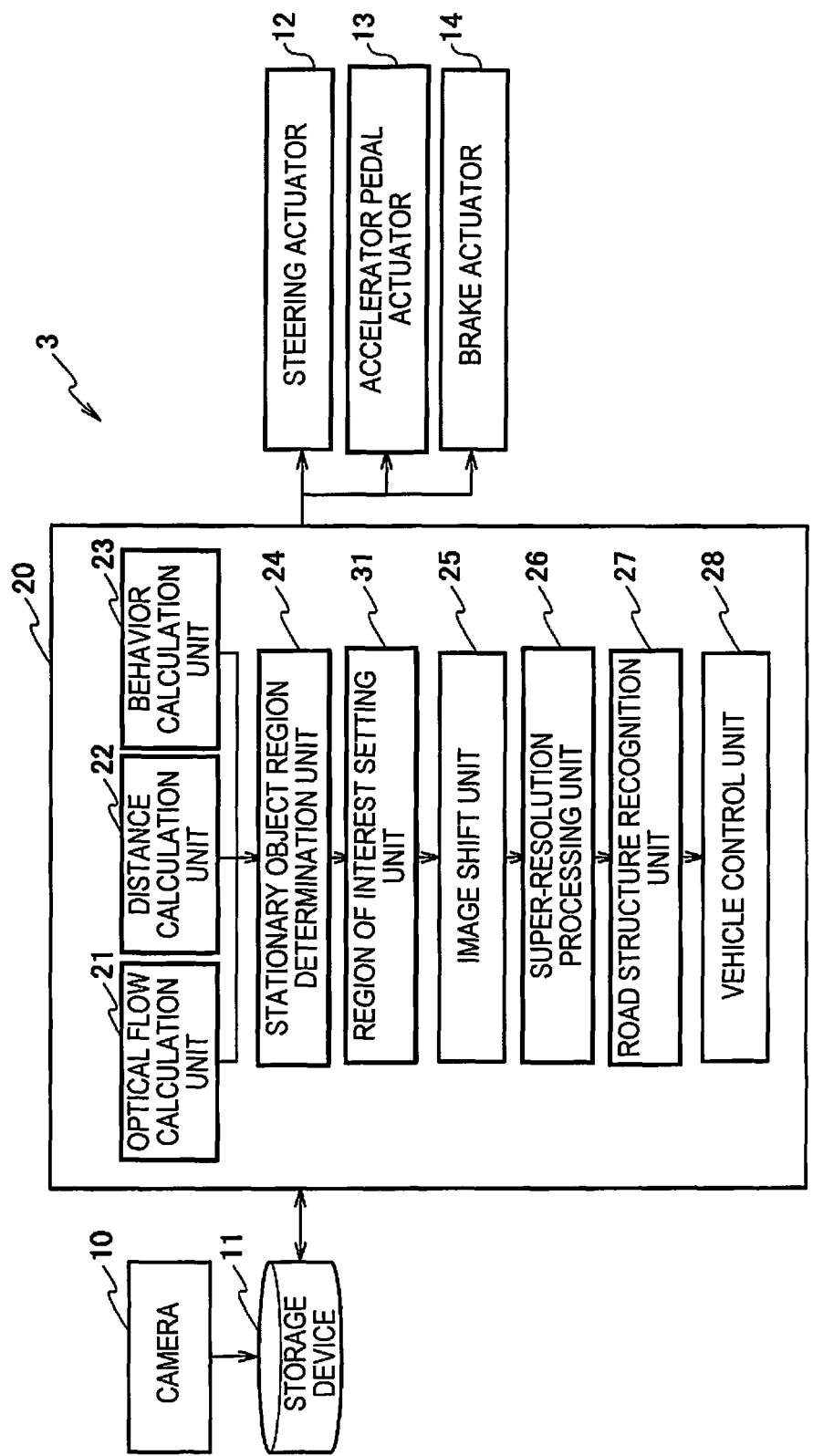
FIG. 8 is a block diagram of a vehicle assist device 3 according to a third embodiment.

A vehicle assist device 3 according to a third embodiment of the present invention will be now described with reference to FIG. 8. The third embodiment differs from the first embodiment in that the controller 20 also includes a region of interest setting unit 31. The same reference numerals have been used for configurations that overlap those of the first embodiment, and their descriptions have been omitted. The following description will focus primarily on the differences.

The region of interest setting unit 31 sets a region of interest. A region of interest is a region in which super-resolution processing is performed.

Figure 9:
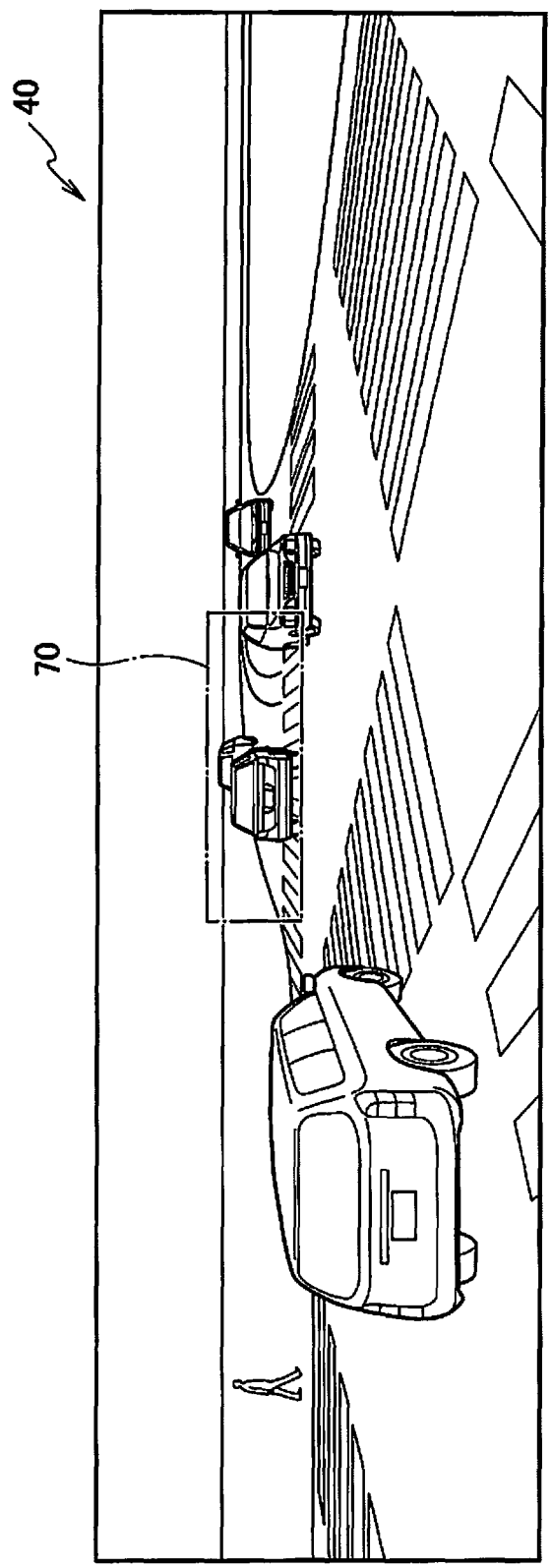
FIG. 9 is a diagram explaining an example of a region of interest 70.

An example of a reference region will now be described with reference to FIG. 9. The image 40 shown in FIG. 9 is the same as the image 40 shown in FIG. 2. Reference numeral 70 shown in FIG. 9 indicates a region of interest. As can be understood from FIG. 9, the region of interest 70 is smaller than the image 40. In the first embodiment, super-resolution processing is performed with respect to the stationary object region of the entire image 40, but in the third embodiment, super-resolution processing is performed with respect to the stationary object region of the region of interest 70. As a result, the computational load is reduced compared to the first embodiment.

Figure 10:
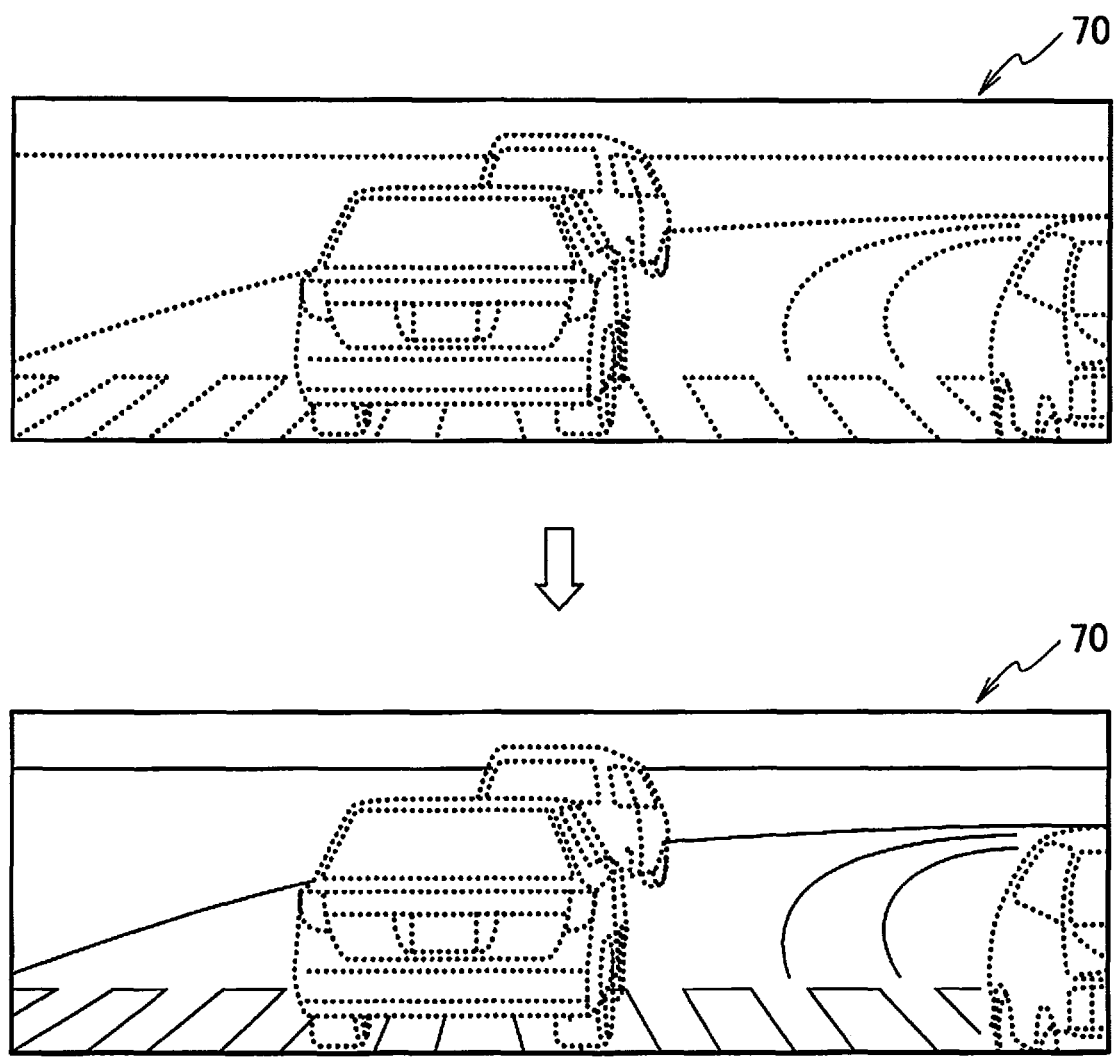
FIG. 10 is a diagram explaining an example of super-resolution processing.

The method of setting the region of interest 70 is not particularly limited; for example, a region distant from the host vehicle is set as the region of interest 70. As shown in FIG. 10, such a distant region becomes clearer by using the super-resolution processing. The upper panel of FIG. 10 is a diagram before the super-resolution processing is carried out, and the lower panel is a diagram after the super-resolution processing is carried out. The recognition accuracy of road markings, traffic lights, signs, etc., that are distant from the host vehicle is improved by using the super-resolution processing (FIG. 10 shows that road markings have become clearer). As a result, the vehicle control unit 28 can quickly carry out control suitable for road markings, traffic lights, and signs. Highly accurate autonomous driving is thereby achieved. The region of interest 70 may be set to the upper half of the image 40. The upper half of the image 40 means a region farther from the host vehicle compared to the lower half.

Figure 11:
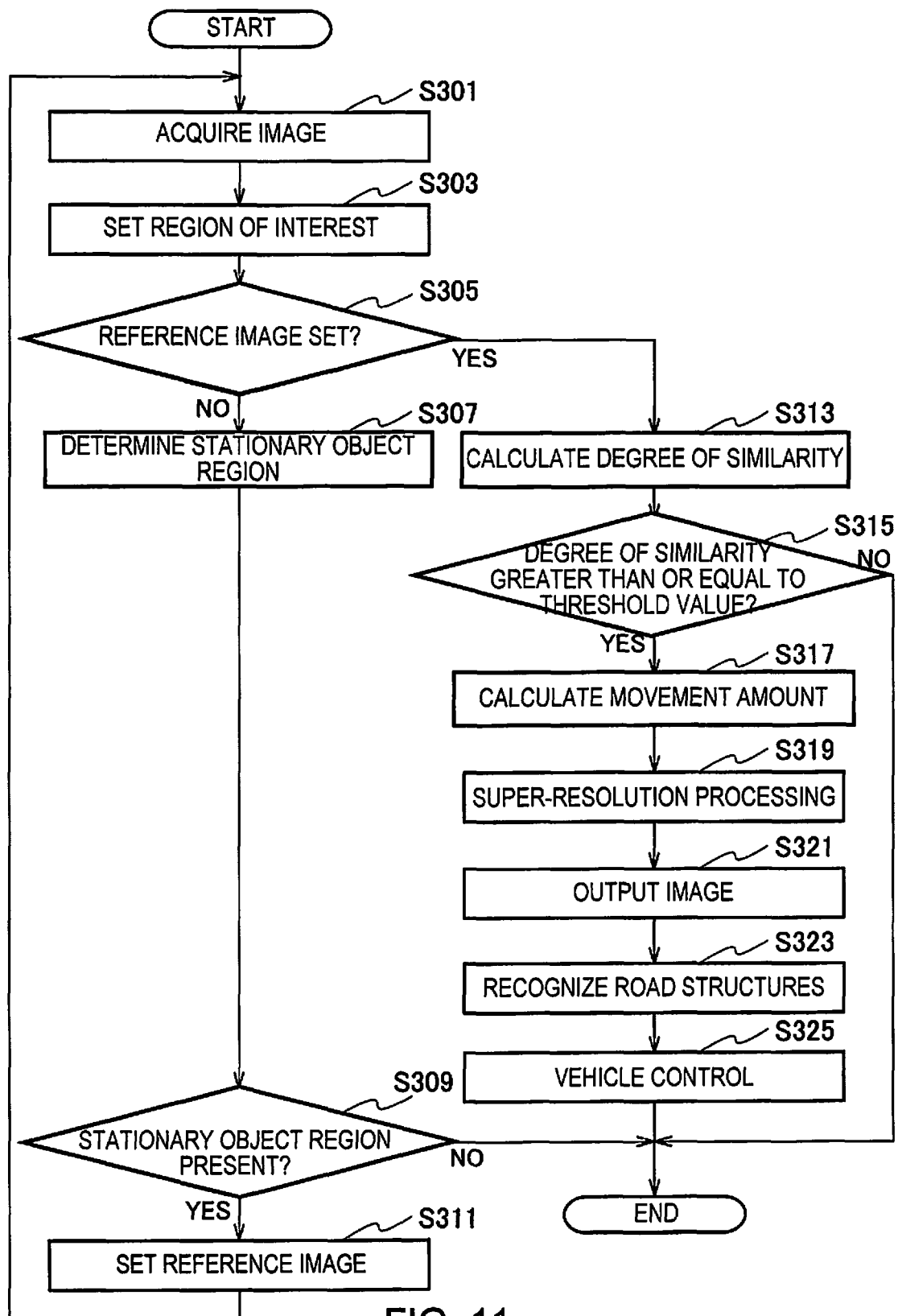
FIG. 11 is a flowchart explaining an operation example of the vehicle assist device 3.

An operation example of the vehicle assist device 3 will now be described with reference to the flowchart shown in FIG. 11. However, the processes of Steps S301-325 are the same as the processes of Steps S101-S123 shown in FIG. 3, so that their descriptions have been omitted.

In Step S303, the region of interest setting unit 31 sets the region of interest 70 that is smaller than the image 40 (refer to FIG. 9).

As described above, the following actions and effects can be achieved by using the vehicle assist device 3 according to the third embodiment.

The controller 20 sets the region of interest 70 in a region distant from the host vehicle and extracts a stationary object region in the region of interest 70. As a result, it becomes possible to increase the resolution of only those region of the image that are of interest (for example, a region distant from the host vehicle).

The region of interest 70 includes at least one of the following: a travel boundary line indicating the lane in which the host vehicle is traveling, a traffic light in the direction in which the host vehicle is traveling, and a sign in the direction in which the host vehicle is traveling. In this manner, by setting the region of interest 70 in the distance in the direction in which the host vehicle is traveling, the recognition accuracy of travel lane boundary lines, traffic lights, signs, etc., distant from the host vehicle is improved.

Each of the functions described in the embodiments above may be implemented by using one or more processing circuits. The processing circuits include programmed processing devices, such as processing devices that include electrical circuitry. The processing circuits also include such devices as application-specific integrated circuits (ASIC) and electronic components arranged to execute the described functions.

Embodiments of the present invention have been described above, but the descriptions and figures that form part of this disclosure should not be understood as limiting the present invention. From this disclosure, various alternative embodiments, examples, and operating techniques should be apparent to those skilled in the art.

As described above, if the number of images required for carrying out super-resolution processing is set to Z, images whose center pixels are aligned are stored for Z frames in order to perform super-resolution processing. However, if the number of images captured by the camera 10 is less than the set number Z, and there is no region that has a degree of similarity of a threshold value or more in the search range for calculating the movement amount in images taken at times different from that of the reference image, the super-resolution processing unit 26 may use images which had been alignment until that time of performing super-resolution processing. The recognition accuracy of road structures can thus be improved.

Further, if the number of images captured by the camera 10 is less than the set number Z, and there is no region with a degree of similarity equal to or greater than a threshold value in the search range for calculating the movement amount in images taken at times different from that of the reference image, the super-resolution processing unit 26 may place the super-resolution processing on standby for a prescribed period of time until the set number Z is reached.

As a result, even if a moving object passes through the entire region of interest 70, super-resolution processing is performed without interruption.

The invention claimed is:

1. A vehicle assist method comprising:
capturing a plurality of images of surroundings of a host vehicle at a plurality of different times using a camera; and
processing the plurality of images using a controller, wherein the processing by the controller includes:
extracting a stationary object region, which is a region corresponding to a stationary object, from each of the plurality of images,
aligning the plurality of images based on a movement amount of the stationary object in the stationary object region in each of the plurality of images,
performing super-resolution processing using the plurality of aligned images in order to generate a super-resolution image that exceeds a resolution of each of the plurality of images captured by the camera, and
recognizing road structures based on the super-resolution image.

2. The vehicle assist method according to claim 1, wherein
the controller calculates the movement amount of a feature point of an image in the stationary object region of each of the plurality of images,
the controller divides the image into segmented regions in which the movement amount of the of the feature point is similar, and
the controller performs the super-resolution processing with respect to each of the segmented regions.

3. The vehicle assist method according to claim 1, wherein
the controller sets a region of interest in a region distant from the host vehicle, and extracts the stationary object region in the region of interest.

4. The vehicle assist method according to claim 1, wherein
the controller sets a reference image, which serves as a reference when the super-resolution processing is performed, from among the plurality of images, and calculates a degree of similarity of a region in which the reference image and images other than the reference image from among the plurality of images overlap, and uses the movement amount based on the degree of similarity to perform the alignment.

5. The vehicle assist method according to claim 2, wherein
the controller replaces the image with the super-resolution image for each of the segmented regions in order generate a single image, and recognizes the road structure based on the single image.

6. The vehicle assist method according to claim 2, wherein
the controller selects a region with a specific movement amount from among the segmented regions.

7. The vehicle assist method according to claim 3, wherein
the region of interest includes at least one of a travel boundary line that indicates a lane in which the host vehicle is traveling, a traffic light and a sign.

8. The vehicle assist method according to claim 1, wherein
the controller extracts the stationary object region based on a three-dimensional motion vector of a feature point measured by at least one of the camera, LiDAR, radar, and a motion sensor of the host vehicle.

9. The vehicle assist method according to claim 2, wherein
the controller sets 1/N pixels as a threshold value of the movement amount in vertical and horizontal directions of the image and divides the stationary object region if the movement amount is greater than or equal to the threshold value, wherein a desired magnification is defined as N.

10. The vehicle assist method according to claim 1, wherein
the controller sets a number of images used for the super-resolution processing, and performs the super-resolution processing if the number of images captured by the camera is greater than or equal to the number of images that were set.

11. The vehicle assist method according to claim 4, wherein
the controller sets a number of images used for the super-resolution processing, and
where the number of images captured by the camera is less than the number of images that were set, and there is no region having a degree of similarity greater than or equal to a threshold value in a search range for calculating the movement amount in images taken at times different from that of a reference image, the controller uses the plurality of aligned images that had been aligned until that time of performing the super-resolution processing.

12. The vehicle assist method according to claim 4, wherein
the controller sets a number of images used for the super-resolution processing, and
where the number of images captured by the camera is less than the number of images that were set, and there is no region with a degree of similarity greater than or equal to a threshold value in a search range for calculating the movement amount in images taken at times different from that of a reference image, the controller places the super-resolution processing on standby for a prescribed period of time until the number of images that were set is collected.

13. The vehicle control method according to claim 1, wherein
the controller controls travel of the host vehicle based on the road structure that was recognized.

14. A vehicle assist device comprising:
a camera that captures surroundings of a host vehicle at a plurality of different times; and
a controller that processes a plurality of images captured by the camera, wherein
the controller is configured to:
extract a stationary object region, which is a region corresponding to a stationary object, from each of the plurality of images,
align the plurality of images based on a movement amount of the stationary in the stationary object region in each of the plurality of images,
perform super-resolution processing using the plurality of aligned images in order to generate a super-resolution image that exceeds a resolution of the image each of the plurality of images captured by the camera, and
recognize a road structure based on the super-resolution image.

* * * * *